UNITED STATES PATENT OFFICE.

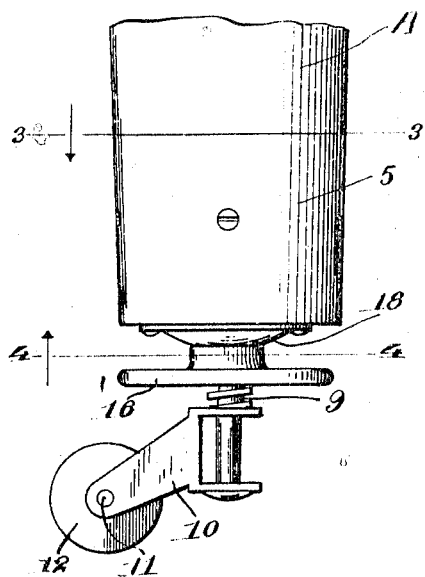

LORENZO SWENSEN, OF MONTPELIER, IDAHO.

ADJUSTABLE CASTER.

1,116,334.   Specification of Letters Patent.   Patented Nov. 3, 1914.

Application filed February 4, 1914. Serial No. 816,416.

*To all whom it may concern:*

Be it known that I, LORENZO SWENSEN, a citizen of the United States, residing at Montpelier, in the county of Bear Lake and State of Idaho, have invented new and useful Improvements in Adjustable Casters, of which the following is a specification.

The invention relates to casters, and more particularly to the class of adjustable casters for use on furniture.

The primary object of the invention is the provision of a caster wherein a piece of furniture can be made level by adjusting the casters supporting the same, the said casters being readily attached to the article of furniture.

Another object of the invention is the provision of a caster wherein the construction thereof is improved to render it readily and easily operable for the adjustment of the same and also for the convenient mounting thereof in an article of furniture, as well as the assemblage of the parts constituting the caster.

A further object of the invention is the provision of a caster which is simple in construction, reliable and efficient in its purpose, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a fragmentary side elevation of the leg of an article of furniture, showing the adjustable caster constructed in accordance with the invention applied thereto. Fig. 2 is a vertical longitudinal sectional view through the same. Fig. 3 is a sectional view on the line 3—3 of Fig. 1. Fig. 4 is a sectional view on the line 4—4 of Fig. 1, looking in the direction of the arrow.

Similar reference characters indicate corresponding parts throughout the several views in the drawing.

Referring to the drawing in detail, A designates a portion of the leg of an article of furniture having applied thereto the caster hereinafter fully described.

The caster comprises a substantially cup-shaped ferrule 5 which is fitted over the end of the leg A, the latter being formed with a socket 6 receiving a sheave or sleeve 7 which is integral with or secured to the convex central portion 8 of the ferrule 5, and rises therefrom for receiving the threaded stem 9 which has swiveled on its outer end a wheel fork 10 carrying the pivot 11 for the caster wheel 12, the stem 9 being slidably held within the sheave or sleeve 7 and is formed in diametrically opposite sides with guide grooves 13 into which project guide ribs or keys 14 formed at diametrically opposite points internally of the sheave or sleeve 7 to prevent the rotation of the stem 9 therein.

Mounted on the stem 9 is the internally threaded hub 15 of a hand-operated turning wheel 16, the threads in the hub 15 being engaged with the threads on the stem 9 so that on the turning of the wheel 16 the said stem 9 will be adjusted in the sheave or sleeve 7 to vary the height of the caster when mounted in the leg A of the article of furniture. The hub 15 is formed with a circular-shaped convex faced head 17 which engages in the central convexed portion 8 of the ferrule 5 and is held therein by means of a two-part ring 18, the latter surrounding the hub 15 and has its two parts riveted to the ferrule 5 so that the head will be rotatably connected to the latter.

On the turning of the wheel 16 the stem 9 will be adjusted in the hub 15 so that the said stem will be raised or lowered vertically for the adjustment of the caster as the occasion may require, and thus hold the article of furniture level irrespective of the unevenness of the floor or foundation, and thereby sustain the article of furniture firmly supported thereon.

It is of course to be understood that the cup-shaped ferrule 5 can be made in any other desirable shape to permit the fitting thereof on any article of furniture, that is to say, the sides of the ferrule can be dispensed with, and its flat disk-like bottom can be secured to the leg or other support of the furniture.

From the foregoing it is thought that the construction and manner of operation of the invention will be clearly understood, and therefore a more extended explanation has been omitted.

What is claimed is:—

An adjustable caster comprising a cup-shaped ferrule adapted to be mounted upon the end of the leg of an article of furniture and having a concaved seat in its outer end centrally thereof, a sleeve rising centrally from the concaved seat and forming a guideway, a threaded stem movable through the seat and within the guideway, a caster bearing swiveled on the outer end of the stem, a caster wheel journaled in said bearing, a sleeve adjustably receiving the threaded stem and having a head resting within the seat in the ferrule, a two-part ring riveted to the outer end of the ferrule for rotatably retaining the head on the sleeve within the seat, and a hand operated turning wheel formed at the outer end of the sleeve.

In testimony whereof I affix my signature in presence of two witnesses.

LORENZO SWENSEN.

Witnesses:
 OLE SWENSEN,
 D. J. SUTTON.